Patented Nov. 3, 1931

1,829,743

UNITED STATES PATENT OFFICE

FRANÇOIS M. DUPONT, OF CHICAGO, ILLINOIS, ASSIGNOR TO INTERNATIONAL WHEAT MALT SYRUP COMPANY, OF CHICAGO, ILLINOIS, A CORPORATION OF DELAWARE

PROCESS FOR THE MANUFACTURE OF WHEAT EXTRACT

No Drawing.    Application filed June 29, 1929.   Serial No. 374,954.

My invention consists of an improved process of treating wheat to produce an extract therefrom which is of solid form as distinguished from liquids, containing sugar in the form of maltose, dextrines and soluble proteins, without the necessity of using or adding other cereals or elements, and it consists also of the improved extract itself.

While extracts have heretofore been made from different cereals and plants, for example, corn, barley, beets, sugar-cane and sorghum, as far as I am aware, extracts of the kind referred to have never been produced from wheat alone, due to the fact that wheat has not responded readily to the treatments heretofore used in producing extracts from the other sources referred to.

By my invention, I first malt the wheat to develop in the grain the enzymes subsequently used in the further steps of treatment. The next steps of my process are peculiar to the treatment of wheat, and are the result of much experimentation to determine just the treatment required to convert the insoluble proteins and starch of the malted wheat into the desired constituents of the resulting extract.

The result of my improved process is a solid or dry extract produced entirely from wheat, which extract as far as I am aware is a novel product and has characteristics radically different from extracts made from other grains. My improved extract is of use in many ways, for example, as a yeast food in the making of bread from wheat flour, as the syrup basis for non-alcoholic beverages, and as a yeast food in the manufacture of yeast, depending upon the relative proportions of sugar or maltose and dextrines contained in the extract.

The present invention is an improvement on the invention disclosed in co-pending application for United States Letters Patent Serial No. 237,120 of which I am one of the applicants.

My invention will be understood by reference to the following detailed description which is illustrative of a preferred manner of carrying out the process.

The wheat is first malted to develop the enzymes diastase and peptase, in the amounts desired.

In the mashing operation which follows the malting operation, the wheat malt is ground to a sufficient degree of fineness to mix readily with the water employed and be permeated by it, the proportions being for example one barrel of water for each one hundred pounds of ground malt. The ground malt and water are mixed thoroughly with the water at a temperature of substantially 35° R., at which temperature the mixture is maintained for about fifteen minutes, after which it is permitted to rest for about one hour, the temperature being preferably maintained as stated during the entire interval. After this, the temperature is raised more or less slowly to from 44° R. to 56° R. and held at that temperature from about thirty minutes to three quarters of an hour, and is then raised to from 58° R. to 62° R. more or less quickly, depending upon the degree of sugar or maltose content desired. In the event a high sugar content is desired with little dextrines in the extract, after the initial rest period of one hour, the temperature is raised slowly to about 44° R., the mixture is held at this temperature for about thirty minutes, it is then raised slowly to about 54° R. and held at that temperature for about fifteen minutes, after which the temperature is raised to about 56° R. in about fifteen minutes and held at that temperature for about fifteen minutes longer. On the other hand, where a low sugar content is desired with a relatively high dextrine content, after the initial rest of one hour, the mixture is increased in temperature quickly to about 56° R. and held at that temperature for from thirty to forty-five minutes, and the temperature of the mixture is then increased to about 62° R., at which temperature it is held until complete conversion of the starch of the wheat is effected, as shown by the well known iodine test. I find that increasing the temperature quickly and to a relatively high degree, produces an extract having a low sugar content and a high dextrine content, whereas increasing the temperature slowly to a lower degree produces an extract having a high sugar content and a low dextrine content. The quantity of sugar or maltose in the extract can be controlled readily by the rapidity of increasing the temperature within the limits referred to, and by the degree to which the mixture is heated within the limits referred to during the mashing operation. Whatever the desired sugar content may be, the peptase acts during the mashing operation to convert the insoluble proteins of the wheat into soluble proteins.

When the starch of the wheat has been converted either into sugar or dextrines or both, as desired, the thin liquid extract is separated from the insoluble residual portion by any convenient means. The liquid extract may then be concentrated to a syrupy consistency in an evaporator, or dried in vacuum or spray dried.

The resulting liquid extract, whether concentrated or not, may be dried in any manner that will not chemically change the constituent parts of the extract, for example by atomizing the liquid extract by means of air under pressure, and spraying the atomized extract into a stream of heated air, the latter preferably being hot enough to at once vaporize practically all of the aqueous content of the extract, but not hot enough to in any degree scorch the dried product. To insure the product against scorching during the drying, it is preferable to leave a slight amount of moisture in the product, for example, not to exceed from one to three per cent, which is not sufficient to interfere with handling and maintaining the product in powdered form resulting from the drying.

The resulting extract contains all of the soluble ingredients of the wheat, including the soluble mineral salts, the soluble maltose and dextrines resulting from the conversion of the starch, and the soluble proteins resulting from the conversion of the insoluble proteins.

When my improved extract is employed in the making of wheat bread, it is desirable that it shall have a high sugar or maltose content to serve as a yeast food in connection with the fermentation that takes place during raising the bread. When used for this purpose, the extract lends itself most advantageously to the purpose, because of its characteristics being entirely derived from the same kind of grain as that employed in the making of the bread, and the result is a bread of whiter appearance, finer grain and better taste, aroma and smoothness than where syrup produced from coarser grains is employed. These advantages apply generally to baked goods made from wheat flour.

Another important use for my improved extract is as the base of non-alcoholic beverages. In this case it is desirable to have a low sugar content, and a relatively high dextrine content is not objectionable but advantageous as a food element, and furthermore the dextrines and soluble proteins serve to produce a creamy and stable foam on the beverage when it is served, that is pleasing and attractive.

My improved extract is also of great use as a yeast food in connection with the manufacture of yeast, since the soluble protein content furnishes the food required by the yeast for its growth and the sugar or maltose and dextrine contents can be controlled so that the requisite proportion of these elements required by the proper growth of the yeast may be had.

It is understood that where the term "extract" is used, it includes the thin solution of the soluble constituents of wheat malt resulting from the process, the solution when concentrated to syrupy consistency, and the practically water-free product resulting from evaporating or otherwise drying the solution.

The time intervals referred to are illustrative of one manner of carrying out the process, and if preferred, the heating of the ground malt and water mixture may be continuous.

While I have shown my invention in the particular embodiment above described, it will be understood that I do not limit myself to this exact treatment as I may employ equivalents known to the art at the time of the filing of this application without departing from the scope of the appended claims.

What I claim is:

1. The process of making wheat malt extract consisting of mixing ground malt in substantially the proportion of one hundred pounds of malt to one barrel of water at about 35° R., agitating the mixture for about fifteen minutes, permitting the mixture to rest for about one hour, heating the mixture slowly to about 44° R. and maintaining that temperature for about thirty minutes, heating the mixture slowly to about 54° R. and maintaining that temperature for about fifteen minutes, heating the mixture to about 56° R. in about fifteen minutes and maintaining that temperature for about fifteen minutes, separating the liquid portion from the solid portion, and atomizing the liquid portion into heated air to evaporate the aqueous portion of the extract.

2. Wheat extract in solid form comprising maltose, dextrines and soluble proteins derived entirely from wheat malt.

3. Wheat extract in solid and powdered form comprising maltose, dextrines and soluble proteins derived entirely from wheat malt.

4. Wheat extract in solid form comprising maltose, dextrines, soluble proteins and soluble mineral salts derived entirely from wheat malt.

5. Wheat extract in solid and powdered form comprising maltose, dextrines, soluble proteins and soluble mineral salts derived entirely from wheat malt.

In witness whereof, I hereunto subscribe my name this 20th day of June, A. D. 1929.

FRANÇOIS M. DUPONT.